(12) United States Patent
McKinnis

(10) Patent No.: US 11,279,289 B2
(45) Date of Patent: Mar. 22, 2022

(54) STEP ASSEMBLY AND VEHICLE

(71) Applicant: Rosenbauer America, LLC, Wyoming, MN (US)

(72) Inventor: Dwight Sherwood McKinnis, Lino Lakes, MN (US)

(73) Assignee: Rosenbauer America, Inc., Wyoming, MN (US)

( * ) Notice: Subject to any disclaimer, the term of this patent is extended or adjusted under 35 U.S.C. 154(b) by 123 days.

(21) Appl. No.: 16/841,028

(22) Filed: Apr. 6, 2020

(65) Prior Publication Data
US 2021/0309154 A1 Oct. 7, 2021

(51) Int. Cl.
*B60R 3/00* (2006.01)
*B62D 21/02* (2006.01)
*B60J 5/04* (2006.01)

(52) U.S. Cl.
CPC ............ *B60R 3/007* (2013.01); *B60J 5/0468* (2013.01); *B62D 21/02* (2013.01)

(58) Field of Classification Search
CPC ......... B60R 3/007; B60J 5/0468; B62D 21/02
See application file for complete search history.

(56) References Cited

U.S. PATENT DOCUMENTS

| 5,584,493 | A | 12/1996 | Demski et al. |
| 8,297,635 | B2 | 10/2012 | Agoncillo et al. |
| 8,668,217 | B2 | 3/2014 | Ziaylek et al. |
| D713,772 | S | 9/2014 | Ziaylek et al. |
| D821,185 | S | 6/2018 | Joshi et al. |
| 10,099,622 | B2 | 10/2018 | Handshke et al. |
| 10,434,949 | B2 | 10/2019 | Handschke et al. |
| D871,992 | S | 1/2020 | Joshi et al. |
| 2020/0062185 | A1 | 2/2020 | Scaringe et al. |

FOREIGN PATENT DOCUMENTS

| CA | 2534019 | 7/2007 |
| CH | 703285 | 12/2011 |
| CN | 208035907 | 11/2018 |
| CN | 208193440 | 12/2018 |
| DE | 2752888 | 5/1979 |
| EP | 2335975 | 6/2011 |
| EP | 2335977 | 6/2011 |
| KR | 101408129 | 6/2014 |
| WO | 2013187868 | 12/2013 |

*Primary Examiner* — D Glenn Dayoan
*Assistant Examiner* — Melissa Ann Bonifazi
(74) *Attorney, Agent, or Firm* — Ballard Spahr LLP

(57) ABSTRACT

A step assembly for a vehicle has first and second arms pivotably attached to brackets which are mountable on the chassis or body of a vehicle. The arms pivot about coaxial axes defined by the brackets. A tread is mounted on the arms. The tread is pivotable between an open position and a closed position. Respective biasing elements act between each arm and bracket to bias the tread into the closed position. When the step assembly is mounted on the vehicle adjacent to a compartment defined by the vehicle body the tread acts as a door when in the closed position and a step when in the open position.

16 Claims, 3 Drawing Sheets

STEP ASSEMBLY AND VEHICLE

FIELD OF THE INVENTION

This invention relates to deployable step assemblies for use with vehicles.

BACKGROUND

Utility vehicles, in particular emergency vehicles such as fire engines, ambulances and rescue vehicles require significant onboard space to store and transport equipment. Additionally, the storage space must be readily accessible for rapid deployment in an emergency event. To this end, steps may be provided on emergency vehicles which allow firefighters and EMTs to reach otherwise inaccessible portions of the vehicle, thereby increasing the vehicle's useful storage space. It is furthermore desirable that other storage space on the vehicle not be limited by the presence of structures such as steps or platforms intended to augment the storage space of a vehicle. There is clearly an opportunity to increase the storage capacity of emergency vehicles using deployable structures which do not take up otherwise useful storage space, but perform dual functions on the vehicle.

SUMMARY

The invention concerns a step assembly mountable on a structure, such as a vehicle. In an example embodiment the step assembly according to the invention comprises first and second brackets arranged in spaced apart relation. The first and second brackets are attachable to the structure. A first arm is mounted on the first bracket and is pivotably movable about a first axis defined by the first bracket. A second arm is mounted on the second bracket and is pivotably movable about a second axis defined by the second bracket. The first and second axes are coaxially aligned. A tread extends between the first and the second arms. The tread is pivotable relatively to the first and second brackets between a stowed position and a deployed position. A first biasing element acts between the first bracket and the first arm for biasing the tread into the stowed position.

In an example embodiment the first bracket may comprise a first bearing. The first bearing defines the first axis. The first arm is pivotably attached to the first bearing. Further by way of example, the first biasing element may comprise a first end pivotably attached to the first bracket, and a second end pivotably attached to the first arm at an attachment point offset from the first axis. By way of example the first biasing element may be selected from the group consisting essentially of a mechanical spring and a pneumatic spring. By way of example the second bracket may also comprise a second bearing which defines the second axis. The second arm is pivotably attached to the second bearing. The step assembly may further comprise a second biasing element having a first end pivotably attached to the second bracket, and a second end pivotably attached to the second arm at a second attachment point offset from the second axis. The second biasing element may also be selected from the group consisting essentially of a mechanical spring and a pneumatic spring.

An example step assembly according to the invention may further comprise first and second stop surfaces extending respectively from the first and second brackets. The first stop surface engages the first arm and the second stop surface engages the second arm when the tread is in the deployed position. A further example embodiment comprises a tab extending from an edge of the tread. The edge is positioned distal to the first and second brackets.

The invention also encompasses a vehicle. An example vehicle embodiment comprises a chassis. A body is mounted on the chassis. The body defines at least one compartment within the body, and an opening providing access thereto. A door is mounted on the body. The door is movable between a closed position overlying a first portion of the opening and an open position exposing the opening to permit access to the compartment. A step assembly is mounted on the body or the chassis. The step assembly is located adjacent to the compartment. By way of example the step assembly comprises first and second brackets arranged in spaced apart relation. The first and second brackets are mounted on the body or the chassis of the vehicle. A first arm is mounted on the first bracket and is pivotably movable about a first axis defined by the first bracket. A second arm is mounted on the second bracket and is pivotably movable about a second axis defined by the second bracket. The first and second axes are coaxially aligned. A tread extends between the first and the second arms. The tread is pivotable relatively to the first and second brackets between a closed position overlying a second portion of the opening, and an open position providing access to the compartment. The tread acts as a step when in the open position.

An example vehicle may further comprise a first biasing element acting between the first bracket and the first arm for biasing the tread into the closed position. In an example embodiment the first bracket comprises a first bearing. The first bearing defines the first axis and is pivotably attached to the first bearing. The first biasing element comprises a first end pivotably attached to the first bracket, and a second end pivotably attached to the first arm at an attachment point offset from the first axis. Byway of example the first biasing element may be selected from the group consisting essentially of a mechanical spring and a pneumatic spring. By way of further example the second bracket comprises a second bearing. The second bearing defines the second axis. The second arm is pivotably attached to the second bearing. The example step assembly may further comprise a second biasing element having a first end pivotably attached to the second bracket, and a second end pivotably attached to the second arm at a second attachment point offset from the second axis. The second biasing element may be selected from the group consisting essentially of a mechanical spring and a pneumatic spring.

By way of example, first and second stop surfaces may extend respectively from the first and second brackets. The first stop surface engages the first arm and the second stop surface engages the second arm when the tread is in the open position.

An example embodiment may further comprise a tab extending from an edge of the tread. The edge is positioned distal to the first and second brackets. The tab engages the door when both the tread and the door are in the closed positions.

In an example embodiment the vehicle comprises an emergency vehicle, such as a fire engine.

DETAILED DESCRIPTION

Figure 1:
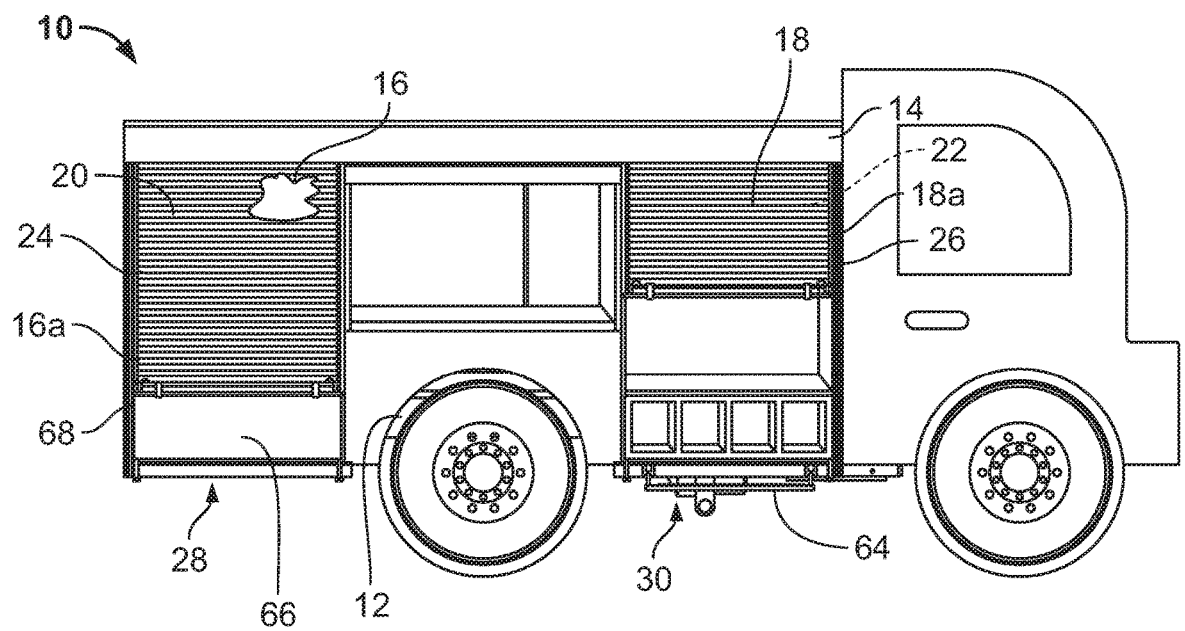
FIG. 1 is a side view of an example vehicle having step assemblies according to the invention.

FIG. 1 shows an example embodiment of a vehicle 10, in this example an emergency vehicle (a fire engine) according to the invention. Vehicle 10 comprises a chassis 12 on which a body 14 is mounted. Body 14 defines one or more compartments 16 and 18 within the body, each compartment having a respective opening as illustrated at 16a and 18a providing access to the compartments.

Respective doors 20 and 22 are associated with compartments 16 and 18. Doors 20 and 22 are mounted on the body 14 and are movable between a closed position and an open position. Door 20 illustrates a door in the closed position overlying a first portion 24 of opening 16a of its associated compartment 16. Door 22 (shown in phantom line) illustrates a door in an open position exposing a portion 26 of opening 18a to permit access to its associated compartment 18. In this example embodiment the doors are "roll-up" doors, but it is understood that other types of doors, such as hinged doors are also feasible. Furthermore, the compartments 16 and 18 in this example are storage compartments, however, other types of compartments, such as passenger compartments, or machinery compartments (compartments housing pumps, hydraulics, electronics and the like) are also exemplary of the invention.

Figure 2:
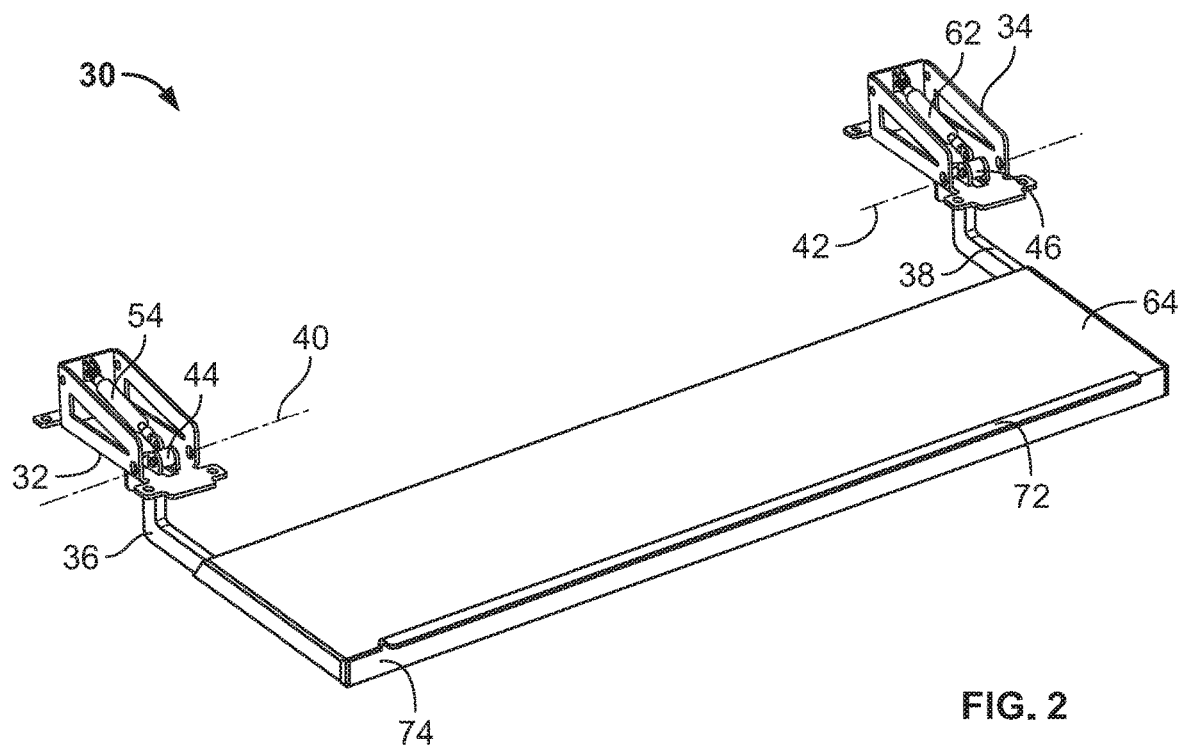
FIG. 2 is an isometric view of an example step assembly according to the invention.
Figure 3:
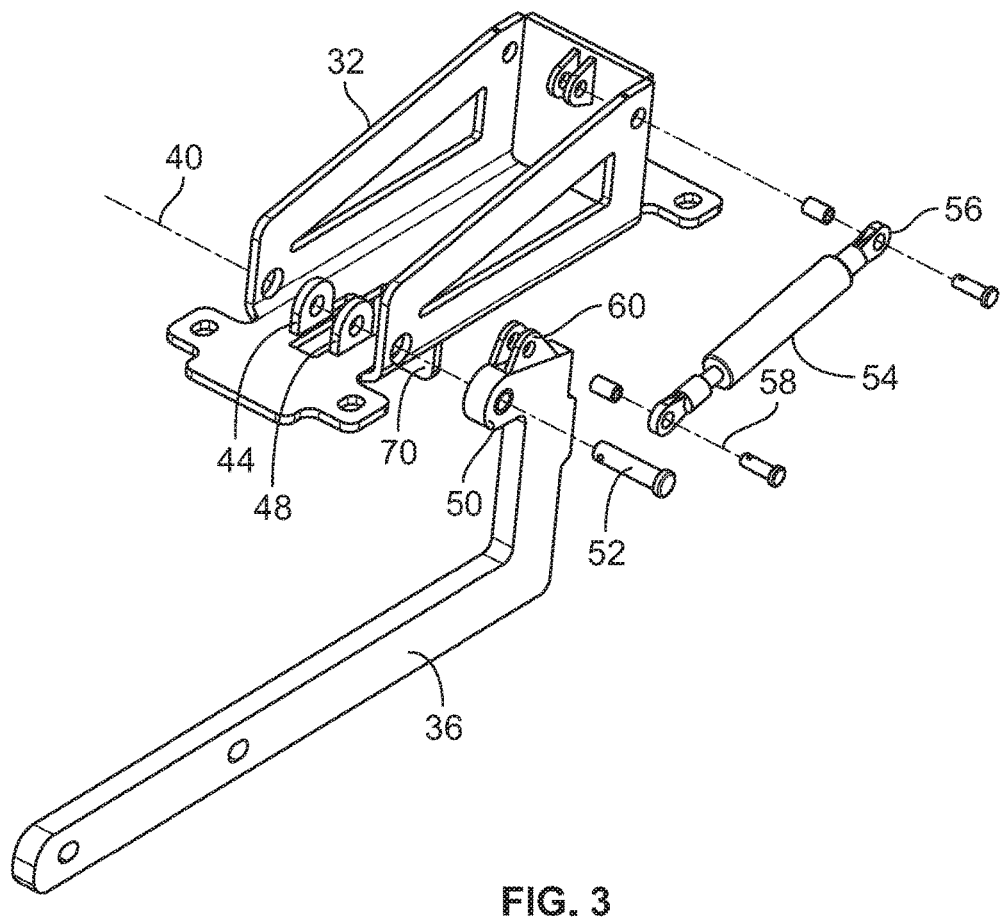
FIG. 3 is an exploded isometric view of a component of the step assembly shown in FIG. 2.

FIG. 1 also shows example step assemblies 28 and 30 associated respectively with compartments 16 and 18. FIG. 2 shows example step assembly 30 in detail, step assembly 28 being identical in this embodiment. Step assembly 30 comprises first and second brackets 32 and 34 arranged in spaced apart relation. Brackets 32 and 34 may be mounted on the vehicle body 14 or the chassis 12. A first arm 36 is mounted on the first bracket 32, and a second arm 38 is mounted on the second bracket 34. Arms 36 and 38 are pivotably movable relatively to the brackets about respective first and second axes 40 and 42 defined by the first and second brackets 32 and 34. The first and second axes 40 and 42 are coaxially aligned to permit both arms 36 and 38 to pivot together through the same arc. Axes 40 and 42 are defined by respective first and second bearings 44 and 46 on each bracket 32 and 34. FIG. 3 shows bracket 32 in detail (bracket 34 being identical) wherein bearing 44 comprises a pair of lugs 48 integrally formed with the bracket 32. Lugs 48 are in spaced relation and receive a lobe 50 of arm 36 between them. Lobe 50 and lugs 48 define holes which receive a pin 52 coaxial with axis 40 and about which arm 36 pivots.

FIG. 3 also shows a first biasing element 54 which extends between the bracket 32 and the arm 36. Biasing element 54 comprises first and second ends 56 and 58 which are pin connected to both the bracket 32 and the arm 36 to permit pivoting of the arm. The first end 56 of the biasing element is attached to the bracket 32 and the second end 58 of the biasing element is connected to the arm 36 at an attachment point 60 offset from the pivot axis 40. This offset attachment permits the biasing element 54 and arm 36 to act as an over center mechanism to hold the arm in a selected position relative to the pivot axis 40. The biasing element 54 may be a pneumatic spring (shown) or a mechanical spring, such as a coil spring. While it is possible for a step assembly to have a single biasing element 54 acting between the bracket 32 and arm 36, the example step assembly embodiment 30 shown in FIG. 2 has a second biasing element 62 which acts between the second bracket 34 and the second arm 38 as described above for the first biasing element.

Figure 4:
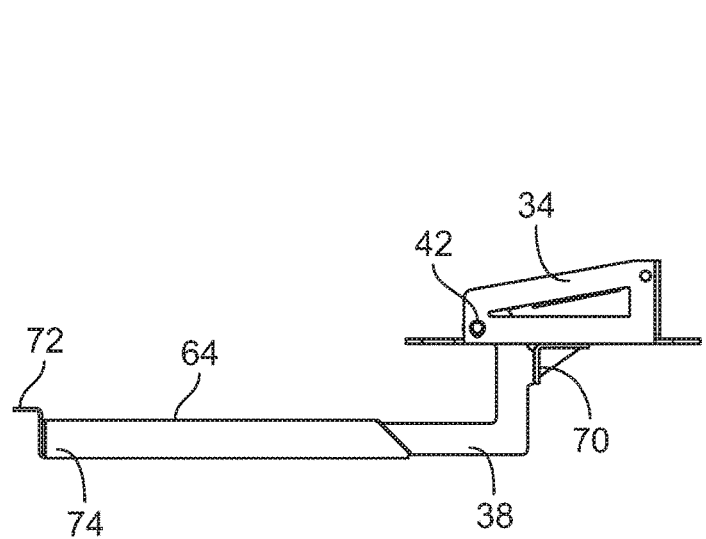
FIG. 4 is a side view of a step assembly in an open position.
Figure 5:
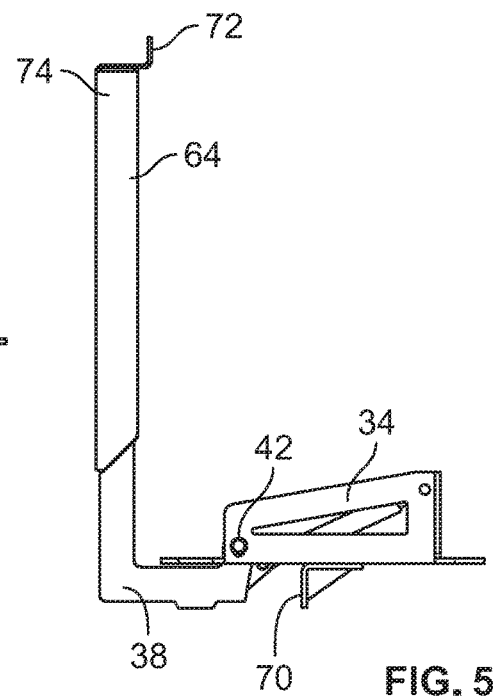
FIG. 5 is a side view of a step assembly in a closed position.

As further shown in FIG. 2 for step assembly 30, a tread 64 extends between the first and the second arms 36 and 38. (Similarly, a tread 66 extends between the arms of step assembly 28 as shown in FIG. 1.) Being mounted on arms 36 and 38, the treads 64 and 66 are pivotable relatively to the first and second brackets 32 and 34 as shown in FIGS. 4 and 5 (tread 64 illustrated). As shown in FIG. 1, the step assemblies 28 and 30 are mounted on vehicle 10 adjacent to their respective compartments 16 and 18. By attaching the brackets 32 and 34 of each step assembly to the chassis 12 or the body 14, an assembly according to the invention is pivotable between a closed position (assembly 28) overlying a second portion (68) of the opening (16a) of the associated compartment (16), and an open position (assembly 30) providing access to the associated compartment (18) through its opening (18a). The tread acts as a door when in the closed position (tread 66 in assembly 28) and acts as a step to permit greater access to the compartment (18) when in the open position (tread 64 in assembly 30).

It is advantageous to set the biasing element or elements 54 and 62 so that they bias the assemblies 28 and 30 into the closed position. This biasing arrangement will counteract the weight of the step assembly and permit smooth deployment and closing during operation. As shown in FIGS. 4 and 5, pivoting motion of each step assembly 28, 30 may be conveniently limited by having a stop surface 70 extending respectively from each bracket 32 and 34 on each assembly. In operation the stop surfaces engage the arms 36 and 38 below the pivot axes 40 and 42 when the tread is in the open position. Stop surfaces 70 will also increase the rigidity of the step assemblies and thereby provide surer footing during use.

Figure 6:
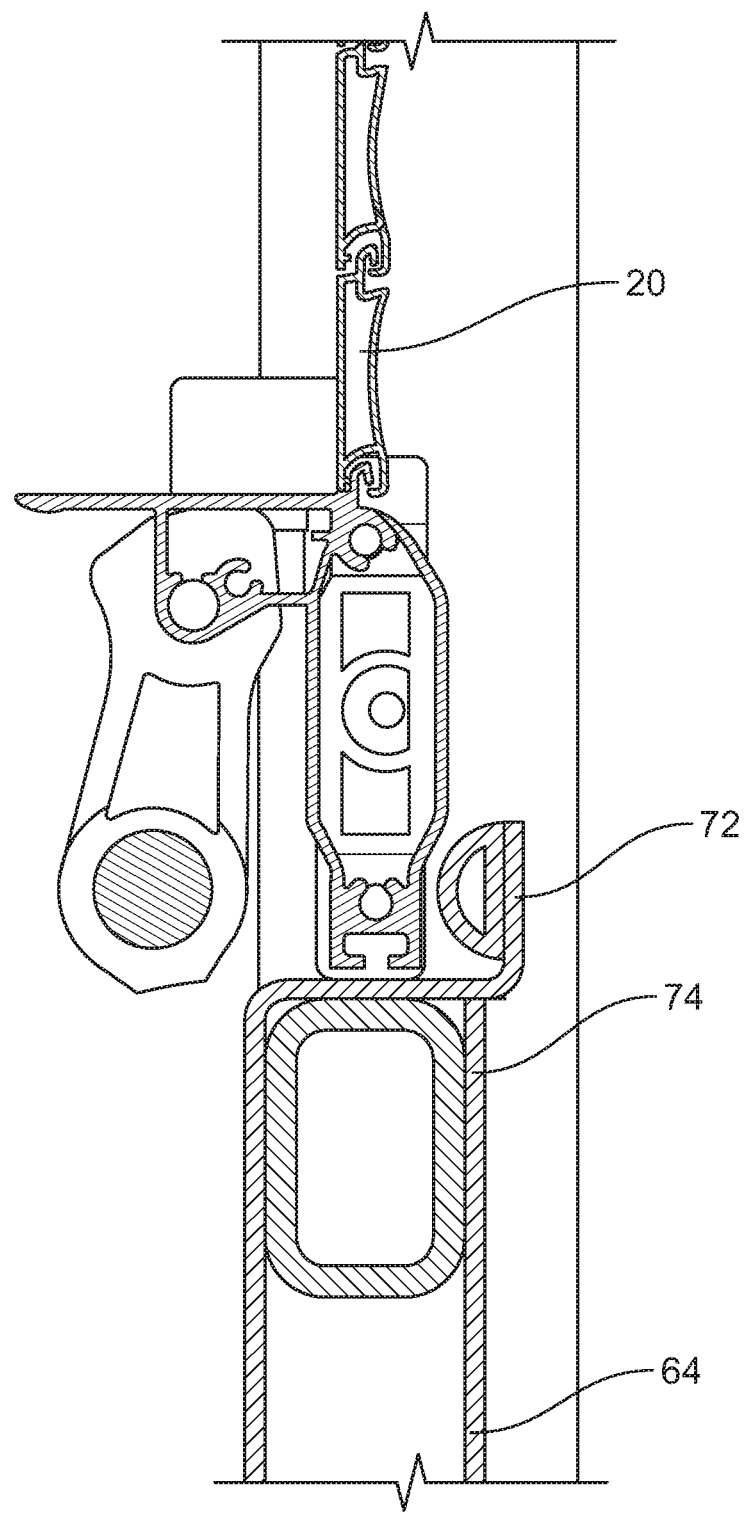
FIG. 6 is a cross sectional view showing the interaction between a step assembly and a door when in the closed position on a vehicle.

As shown in FIGS. 5 and 6, it is additionally advantageous to mount a tab 72 on each tread 64 and 66 (64 shown). Tab 72 extends from an edge 74 of the tread 64 which is positioned distal to the first and second brackets 32 and 34. The tab 70 engages the door 20 or 22 (20 being shown) when both the tread (64, 66) and the door (20, 22) are in their closed positions and acts like a latch.

It is expected that step assemblies according to the invention will provide more convenient access to storage compartments on vehicles. By performing the dual functions of step and door, step assemblies according to the invention will permit formerly inaccessible areas to be used for storage without decreasing any useable storage space on the vehicle.

What is claimed is:

1. A step assembly mountable on a structure, said step assembly comprising:
    first and second brackets arranged in spaced apart relation, said first and second brackets being attachable to said structure;
    a first arm mounted on said first bracket and pivotably movable about a first axis defined by said first bracket;
    a second arm mounted on said second bracket and pivotably movable about a second axis defined by said second bracket, said first and second axes being coaxially aligned;
    a tread extending between said first and said second arms, said tread being pivotable relatively to said first and second brackets between a stowed position and a deployed position;

a first biasing element acting between said first bracket and said first arm for biasing said tread into said stowed position.

2. The step assembly according to claim 1, wherein:
said first bracket comprises a first bearing, said first bearing defining said first axis, said first arm being pivotably attached to said first bearing; wherein
said first biasing element comprises a first end pivotably attached to said first bracket, and a second end pivotably attached to said first arm at an attachment point offset from said first axis.

3. The step assembly according to claim 2, wherein said first biasing element is selected from the group consisting essentially of a mechanical spring and a pneumatic spring.

4. The step assembly according to claim 2, wherein:
said second bracket comprises a second bearing, said second bearing defining said second axis, said second arm being pivotably attached to said second bearing; and
said step assembly further comprises a second biasing element having a first end pivotably attached to said second bracket, and a second end pivotably attached to said second arm at a second attachment point offset from said second axis.

5. The step assembly according to claim 4, wherein said second biasing element is selected from the group consisting essentially of a mechanical spring and a pneumatic spring.

6. The step assembly according to claim 1, further comprising first and second stop surfaces extending respectively from said first and second brackets, said first stop surface engaging said first arm and said second stop surface engaging said second arm when said tread is in said deployed position.

7. The step assembly according to claim 1, further comprising a tab extending from an edge of said tread, said edge being positioned distal to said first and second brackets.

8. A vehicle, said vehicle comprising:
a chassis;
a body mounted on said chassis, said body defining at least one compartment within said body and an opening providing access thereto;
a door mounted on said body, said door movable between a closed position overlying a first portion of said opening and an open position exposing said opening to permit access to said compartment;
a step assembly mounted on said body or said chassis, said step assembly being located adjacent to said compartment, said step assembly comprising:
first and second brackets arranged in spaced apart relation, said first and second brackets being mounted on said body or said chassis;
a first arm mounted on said first bracket and pivotably movable about a first axis defined by said first bracket;
a second arm mounted on said second bracket and pivotably movable about a second axis defined by said second bracket, said first and second axes being coaxially aligned;
a tread extending between said first and said second arms, said tread being pivotable relatively to said first and second brackets between a closed position overlying a second portion of said opening and an open position providing access to said compartment, said tread acting as a step when in said open position; and
a first biasing element acting between said first bracket and said first arm for biasing said tread into said closed position.

9. The vehicle according to claim 8, wherein:
said first bracket comprises a first bearing, said first bearing defining said first axis, said first arm being pivotably attached to said first bearing; wherein
said first biasing element comprises a first end pivotably attached to said first bracket, and a second end pivotably attached to said first arm at an attachment point offset from said first axis.

10. The vehicle according to claim 9, wherein said first biasing element is selected from the group consisting essentially of a mechanical spring and a pneumatic spring.

11. The vehicle according to claim 9, wherein:
said second bracket comprises a second bearing, said second bearing defining said second axis, said second arm being pivotably attached to said second bearing; and
said step assembly further comprises a second biasing element having a first end pivotably attached to said second bracket, and a second end pivotably attached to said second arm at a second attachment point offset from said second axis.

12. The vehicle according to claim 11, wherein said second biasing element is selected from the group consisting essentially of a mechanical spring and a pneumatic spring.

13. The vehicle according to claim 8, further comprising first and second stop surfaces extending respectively from said first and second brackets, said first stop surface engaging said first arm and said second stop surface engaging said second arm when said tread is in said open position.

14. The vehicle according to claim 8, further comprising a tab extending from an edge of said tread, said edge being positioned distal to said first and second brackets, said tab engaging said door when both said tread and said door are in said closed positions.

15. The vehicle according to claim 8, wherein said vehicle comprises an emergency vehicle.

16. The vehicle according to claim 15, wherein said emergency vehicle comprises a fire engine.

* * * * *